Sept. 6, 1960    J. W. POMAZAL    2,951,972
CONTROL MECHANISM FOR AN ELECTRIC ARC WELDER
Filed June 9, 1959    5 Sheets-Sheet 1

INVENTOR.
JESSE W. POMAZAL
BY
Wheeler, Wheeler & Wheeler
ATTORNEYS Sept. 6, 1960   J. W. POMAZAL   2,951,972
CONTROL MECHANISM FOR AN ELECTRIC ARC WELDER
Filed June 9, 1959   5 Sheets-Sheet 3

INVENTOR.
JESSE W. POMAZAL
BY
Wheeler, Wheeler & Wheeler
ATTORNEYS

United States Patent Office 2,951,972
Patented Sept. 6, 1960

2,951,972

CONTROL MECHANISM FOR AN ELECTRIC ARC WELDER

Jesse W. Pomazal, Escanaba, Mich., assignor to Harnischfeger Corporation, Milwaukee, Wis., a corporation of Wisconsin Filed June 9, 1959, Ser. No. 819,103

15 Claims. (Cl. 315—311)

This invention relates to an improvement in control mechanism for an electric arc welder and in which the welding current is controlled automatically in response to welding voltage and welding current characteristic of various stages in the welding cycle.

Heretofore it has been common for electric arc welders to be subject to manual control by the operator, who can vary the welding current by manipulating manually operated controls. The present invention eliminates need for the operator to exercise manual control in favor of an automatic control which is both positive and foolproof. The present invention accomplishes the following objectives:

(1) The operator may preselect a desired welding current level which the machine will deliver at the continuous welding stage of the welding cycle.

(2) All welds will automatically start at a low current value to avoid blasting.

(3) As soon as the arc is established at the low current value aforesaid, the current will automatically increase from such low value to the preselected continuous welding level aforesaid in a period of time which can be varied to meet specific conditions.

(4) When the end of the weld is approached, the operator may energize a decay circuit to decay (reduce) the current to the low current value aforesaid and in a period of time which may be varied to meet specific conditions. Accordingly, the arc will snuff out and formation of craters at the end of a weld will be avoided.

(5) If the operator interrupts the weld without first actuating the decay circuit, the control is such that the decay circuit will be automatically actuated so that the next weld will start at the minimum current value to prevent blasting.

In the preferred embodiment of the present invention, welding current is desirably controlled primarily by means of a saturable reactor having energizing windings supplied with control current through a circuit including a rheostat which is reversibly driven by an electric motor. When the motor drives a rheostat in one direction, the saturable reactor will be energized to build up the welding current and when the motor drives the rheostat in the other direction, the saturable reactor will be energized to decay the welding current. In the disclosed embodiments of the invention, the motor is made reversible and the motor circuit is provided with reversing switches which are connected to relays responsive to values of welding current and voltage characteristic of stages of the welding cycle so that the rheostat will be automatically positioned to accomplish the above objectives. The only manual feature of the device is a decay switch which the operator may use at his discretion. In all other respects, the device is fully automatic.

Other features, objects and advantages of the invention will appear from the following disclosure in which.

The direct current motor embodiment shown in Figs. 1 through 6 will first be described.

The welding electrodes consist of the weld rod 16 and workpiece 17 respectively connected to welding current lines 18, 19. These lines are connected to a source 20 of A.C. welding current through switch 67 which conventionally may be incorporated in a foot control proximate the operator at the welding site. Line 19 includes A.C. reactor coil 21 wound around one leg 22 of a saturable reactor frame 23 having another leg 24 upon which the excitation or saturation coil 25 is wound. The respective ends of saturation coil 25 are connected to D.C. supply lines 29, 30.

Alternating current emanating from source 28, which may conveniently be in the range of 26 volts, is rectified in the full wave bridge rectifier 31, the D.C. output of which is fed through lines 32 and 33 through control elements including a main control potentiometer 34 and a motor-driven rheostat 35. Potentiometer 34 is set to produce the desired maximum excitation for the saturation windings 25 when the rheostat is out of the circuit. Below said maximum the direct current supplied to the windings 25 is controlled by the rheostat 35.

The arm 36 for the rheostat 35 is on the shaft 37 of armature 40 of a direct current electric motor having its field winding 41 connected directly across the lines 42, 43 from the source 44 of direct current. Depending upon the direction of rotation of the armature 40, the rheostat arm 36 will be driven either to increase or decrease the resistance of the rheostat 35.

The alternating current winding 21 of the reactor 23 will impede flow of welding current in line 19, depending upon the degree of saturation of the reactor frame. When the D.C. saturation winding 25 is substantially de-energized and the reactor is substantially unsaturated (with D.C. pre-magnetization), the A.C. winding 21 will offer maximum impedance to the flow of welding current. For such minimum excitation of the D.C. saturation coil 25, the resistance of rheostat 35 should be substantially entirely in the circuit as it is shown in Figs. 1, 2, 4, 5 and 6. In this position the arm 36 is at its extreme counter-clockwise position, as shown in the drawings, and it is towards this position that the armature 40 tends to drive the rheostat arm when it is desired to reduce or "decay" welding current.

Figure 3:
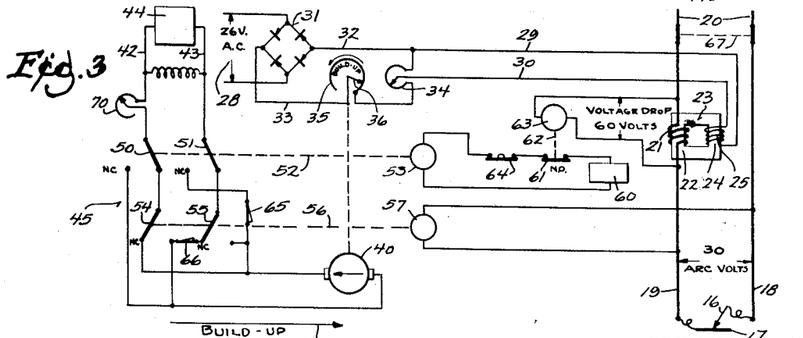

To reduce the impedance of the A.C. coil 21 to the flow of welding current, the D.C. saturation coil 25 is highly excited to saturate the reactor frame and, in effect, give the A.C. coil 21 air core characteristics. For this purpose the arm 36 of the rheostat 35 is rotated clockwise for maximum excitation of the D.C. winding 25, as is shown in Fig. 3.

The preferred embodiments of the invention incorporate reversible motors rather than reversing transmissions to drive arm 36.

For proper automatic positioning of the arm 36 of rheostat 35 in response to voltage and current conditions in the welding line, an armature reversing switching network 45 in the armature circuit is provided. The position of the various switches in the switching network will determine the polarity of the armature 40 and hence its direction of rotation. Current must flow through the armature in the direction of arrow 46 to rotate the arm 36 of the rheostat 35 clockwise to build up current flowing in the welding electrode circuit. Current must flow in the direction of arrow 47 to rotate the arm 36 of rheostat 35 counterclockwise to decay the current flowing in the circuit to the welding electrodes.

The network 45 includes interconnected normally closed switches 50, 51, both of which are mounted on the armature 52 of DPDT relay 53. Another set of interconnected switches 54, 55 are mounted on the armature 56 of DPDT relay 57.

Relay 57 is responsive to the voltage across the welding circuit lines 18, 19. In a practical embodiment of the invention, this relay picks up in the range of 50 to 55 volts to move the switch blades 54, 55 to their positions shown in Fig. 2. Relay 57 drops out in the range of 30 to 40 volts to move the switch blades 54, 55 to their normally closed positions shown in Figs. 1, 3, 4 and 6.

Relay 53 has a constant voltage supply source 60 but is normally de-energized by reason of the normally open switch 61 mounted on the armature 62 of relay 63. Relay 63 is responsive to the voltage drop across the A.C. winding 21 of the saturable reactor 23. It will pick up in the range of 50 to 55 volts to close switch 61 and will drop out in the range of 30 to 35 volts to open the switch 61. When energized, relay 53 shifts switch blades 50, 51 to their positions shown in Fig. 3. When relay 53 is de-energized, the blades 50, 51 normally return to their positions shown in Figs. 1, 2, 4, 5 and 6.

There is also manually-operated normally closed decay switch 64 in the circuit to relay 53.

In order to de-energize the motor armature 40 at extreme positions of the contact arm 36 of the rheostat 35, I provide in network 45 a decay limit switch 65 which is normally closed, but will open when the arm 36 reaches a preset extreme counterclockwise position. A similar normally closed build-up limit switch 66 is also provided in network 45. Switch 66 will open when the contact arm 36 reaches its extreme clockwise position. When either switch is open, the armature is de-energized to remove torque from the arm 36.

Figure 14:
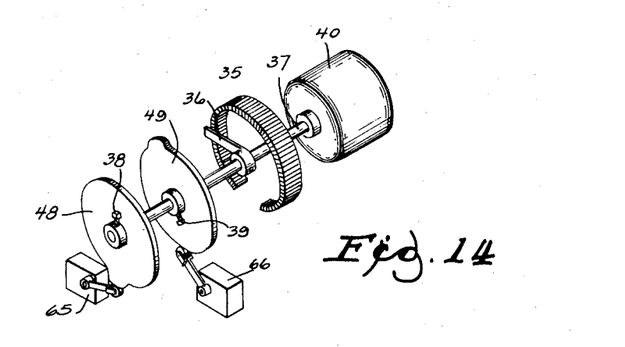
Fig. 14 is a perspective view of circuit components associated with the motor.

Fig. 14 shows one embodiment of the physical relation between the limit switches 65, 66 and the rheostat 35. Arm 36 is mounted on shaft 37 of motor armature 40. Shaft 37 is also provided with cams 48, 49 which engage the contact arms for the switches 65, 66 when the arm 36 is in its extreme positions. The cams 48, 49 are readily adjustable on shaft 37 by reason of set screws 38, 39 to change the ultimate extreme positions of the arm 36. Accordingly, both the minimum and maximum welding current can be pre-set by appropriate setting of the cams 48, 49.

Figure 1:
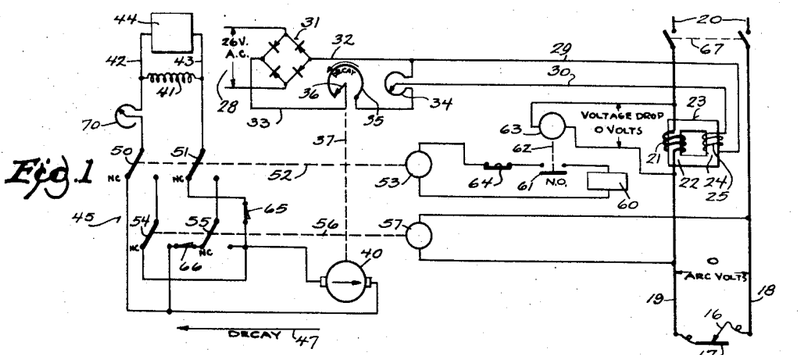
Figs. 1 through 6 are schematic circuit diagrams showing a circuit embodying the invention and in which a direct current reversing motor is used for actuating the rheostat, each figure showing a different stage in the welding cycle.

The operation of the circuit is as follows:

*Figure 1*

Fig. 1 shows the position of the various switches, etc., when the power supply for the motor is on, but the welding machine is otherwise inactive, master control switch 67 being open. Relays 53, 57 have dropped out and switches 50, 51, 54 and 55 are in normally closed position and the current flow through the armature is in the direction of arrow 47, thus energizing the motor armature 40 in a direction to turn the rheostat arm 36 to its extreme counter-clockwise decay direction. When the arm 36 has reached its extreme counter-clockwise position, decay limit switch 65 will open to de-energize the armature. This operation merely sets the rheostat 35 for minimum excitation of the D.C. saturation coil 25 of the reactor 23. In this initial stage of the welding cycle, the voltage drop across the A.C. reactor winding 21 and the voltage drop across the welding electrodes is zero, as indicated in the legends in Fig. 1 of the drawing.

Figure 2:
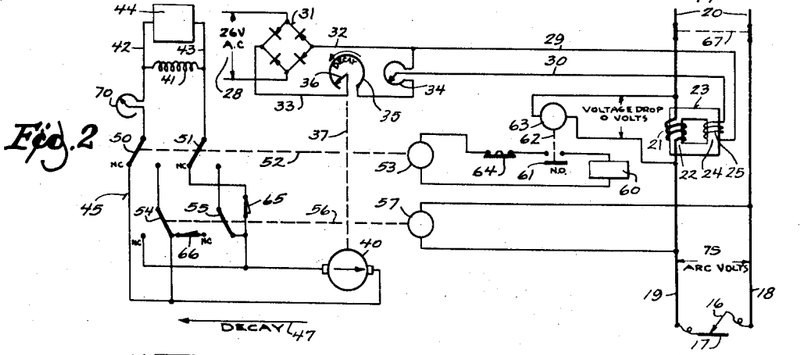

*Figure 2*

This figure illustrates the position of the various switches, etc. when the operator closes switch 67, but has not yet struck an arc. Accordingly, there is no current flowing in the welding line and the voltage across relay 63 is zero. However, there is substantially maximum open circuit voltage across the electrodes, for example 75 volts as indicated in the legend on the drawing. Under these circumstances, relay 57 picks up to move the switches 54, 55 to their positions shown in Fig. 2. However, this does not alter the flow of current in the direction of arrow 47 to the motor armature 40, and, in any event, the decay limit switch 65 is now open. Accordingly, the arm 36 of the rheostat 35 remains in its extreme counter-clockwise position.

*Figure 3*

This figure illustrates the condition of the circuit components after the operator has struck an arc. Because the saturation coil 25 of the reactor 23 is at minimum excitation, the A.C. winding 21 of the reactor provides maximum impedance and there will be a minimum initial flow of current in the welding circuit, thus to start the weld without blasting. The actual current flow in the D.C. coil 25 of the reactor will be determined both by the resistance of rheostat 35 and the setting of the potentiometer 34. As aforestated, potentiometer 34 will be preset by the operator.

The flow of welding current through the A.C. winding 21 will cause a voltage drop across the relay 63, for example 60 volts, as indicated by the legend in Fig. 3, of sufficient value to pick up the relay and close the switch 61 and thus energize the relay 53 to shift switch blades 50, 51 from their position shown in Fig. 2 to their position shown in Fig. 3. At the same time, the voltage drop across the A.C. reactor coil 21 will result in a drop in the voltage across the electrodes to a closed circuit value, for example 30 volts, as indicated in the legend in the drawing. Accordingly, relay 57 will drop out and the switch blades 54, 55 will return to their normally closed position as illustrated in Fig. 3.

The polarity of the armature 40 of the motor is now reversed and the current flows through the armature in the direction of arrow 46 to drive the arm 36 of rheostat 35 clockwise, thus to increase the excitation of the direct current saturation winding 25 of the reactor 23 and tend to saturate the reactor.

The setting of the armature speed control rheostat 70 will determine the speed of rotation of armature 40 and, accordingly, will predetermine the time required to move the arm 36 of the rheostat 35 to its extreme clockwise position. For example, it may be desired to build up the welding current in about ten seconds and rheostat 70 can be set for this period or for any other period appropriate under the circumstances.

As the reactor becomes saturated, the impedance offered by the A.C. coil 21 thereof will drop to a minimum, thus automatically increasing the current flow to the welding electrodes to the maximum permitted by the setting of potentiometer 34. As soon as the arm 36 of the rheostat 35 reaches its extreme clockwise position, the build-up limit switch 66 will be opened to de-energize the armature 40 and hold the arm 36 at its extreme clockwise position. The operator now continues to weld at the maximum welding current previously selected by the setting of potentiometer 34.

Figure 4:
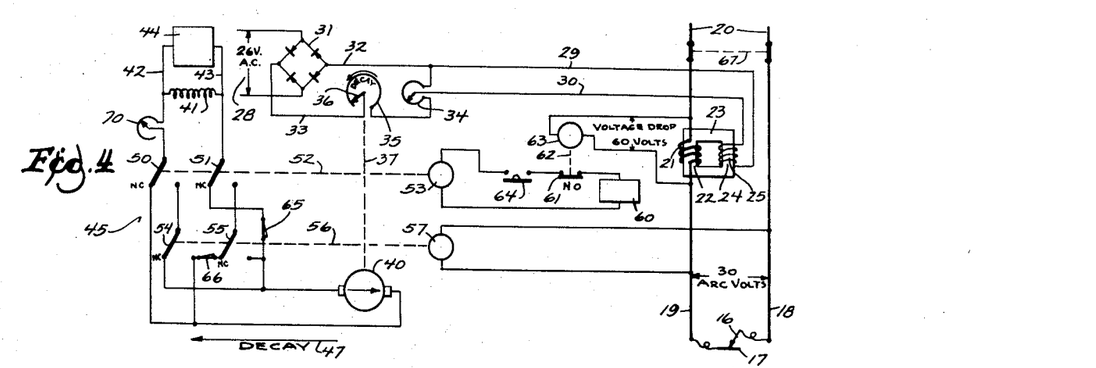
Figure 5:
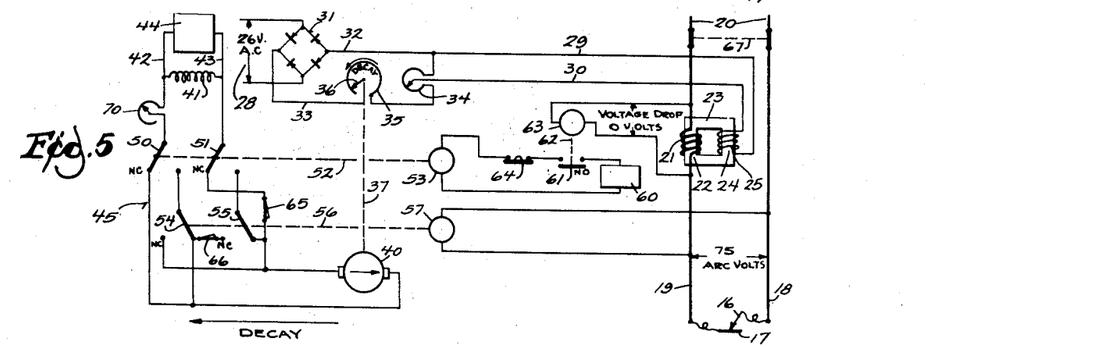
Figure 6:
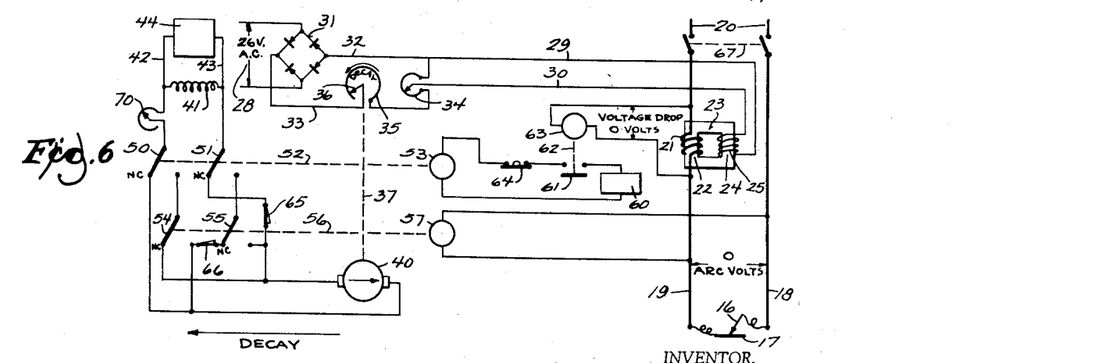

The operator may break the arc in any one of three ways illustrated in Figs. 4, 5 and 6.

*Figure 4*

One of the ways for the operator to break the arc is to manually open the normally closed decay switch 64.

This breaks the circuit to the relay 53 which will drop out and permit the switch contacts 50, 51 to return to their normally closed position. Decay limit switch 65 having previously closed pursuant to clockwise rotation of the rheostat, the circuit is now such that the polarity of the armature is restored to that shown in Fig. 1 and the current flows in the direction of arrow 47. The arm 36 of rheostat 35 is now driven counterclockwise to its welding current decay position and during a period of time depending upon the setting of the rheostat 70.

Figure 13:
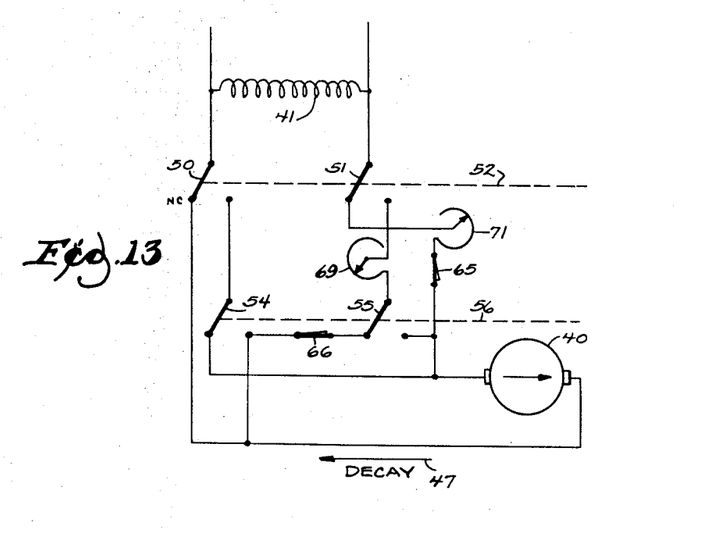
Fig. 13 is a fragmentary schematic circuit diagram showing a modification of the circuits of Figs. 1–6.

In this connection, reference is made to Fig. 13 which shows a modification in which there are separate rheostats in the circuit for controlling buildup and decay speeds. Rheostat 69 is set to control armature speed only for buildup of welding current and rheostat 71 is set to control armature speed for decay of welding current. Under some circumstances, the decay time should be set differently than the buildup time, although under many circumstances, a single rheostat 70, as shown in Fig. 4, will suffice for both settings.

The operator simply continues to weld and as soon as the current flow in the electrode circuit drops low enough, the arc will snuff out without forming a crater.

*Figure 5*

Fig. 5 illustrates the situation where the operator fails or prefers not to open the manual decay switch 64. The operator may prefer simply to break the arc by lifting the weld rod 16. In these circumstances and in the absence of the present invention, a crater might be formed when the next arc is struck, because of the blasting effect of the high current which would otherwise tend to flow as soon as the arc was recreated. However, as shown in Fig. 5 and pursuant to the automatic features of the present device, the rheostat arm 36 will be turned counterclockwise from its position shown in Fig. 3 to its position shown in Fig. 5. This is because as soon as the arc is broken, current will cease flowing in lines 18, 19 and the voltage drop across the A.C. reactor coil 21 will be zero, as shown in the legend in Fig. 5. Relay 63 will then drop out to cause switch 61 to open, thus opening the circuit to the relay 53 which will then drop out to permit the switch blades 50, 51 to be restored to their normally closed positions.

Accordingly, the polarity of the armature 40 will be the same as is shown in Fig. 4 and current will flow therethrough in the direction of arrow 47 and the arm 36 of the rheostat will be driven toward its extreme counterclockwise position. Accordingly, if the operator again strikes an arc, the apparatus will have been automatically set for minimum welding current and the next arc will start smoothly and without blasting.

Note that in Fig. 5, relay 57 has picked up to move the contacts 54, 55 to their position shown in this figure. This is because open circuit voltage, for example 75 volts, has been imposed on relay 57. However, this does not affect the direction in which the current flows through the armature 40, since with the switches 50, 51 positioned as shown in Fig. 5, the position of the switches 54, 55 is immaterial.

*Figure 6*

Fig. 6 illustrates the situation where the operator breaks the arc by opening the switch 67. Accordingly, both relays 53, 57 drop out to position switches 50, 51, 54, 55 as illustrated and polarize the armature 40 to drive the rheostat arm 36 to its extreme counterclockwise position. As aforestated, in such position, the decay limit switch 65 will open to preclude overtravel of the motor.

The circuits shown in Figs. 7 through 12 are comparable to those shown in Figs. 1 through 6 and all like parts are given the same reference characters. In this embodiment of the invention, however, the arm 36 of the rheostat 35 is driven by a reversible A.C. motor 72 having reversing switches 73, 74 mounted respectively on the armatures 52, 56 of the relays 53, 57. In this embodiment of the invention, relays 53, 57 desirably are of the single-pole double-throw type, inasmuch as each relay need only actuate a single switch blade.

The direction of rotation of the armature of motor 72 depends on the direction of current flow through the switching network 75 which includes the switches 73, 74. For rotation of the control arm 36 of the rheostat in a direction to build up the current in the welding line, the current can be assumed to flow through the motor 72 in the direction of arrow 76. For decay of such current, the current will flow in the opposite direction of arrow 77. Arm 36 is connected to motor armature on shaft 78.

The A.C. motor control circuit is particularly appropriate where it is deemed unnecessary to provide for adjustments in the speed of the motor, such as are provided for by rheostats 69, 70, 71 of the embodiment of the invention shown in Figures 1 through 6. The motor speed or the drive ratio of the transmission to the motor will be so set that for most conventional situations, the rate of buildup and decay of welding current will be satisfactory. A governor may be added for speed control.

Motor 72 may be of the stall type or there may be a slip clutch in shaft 78 between the armature of the motor and the rheostat control arm 36 so that the motor will not be damaged when the rheostat control arm reaches its extreme position in either direction of rotation. Limit switches similar to 65, 66 of the previously described embodiment could also be incorporated in this embodiment.

Figure 7:
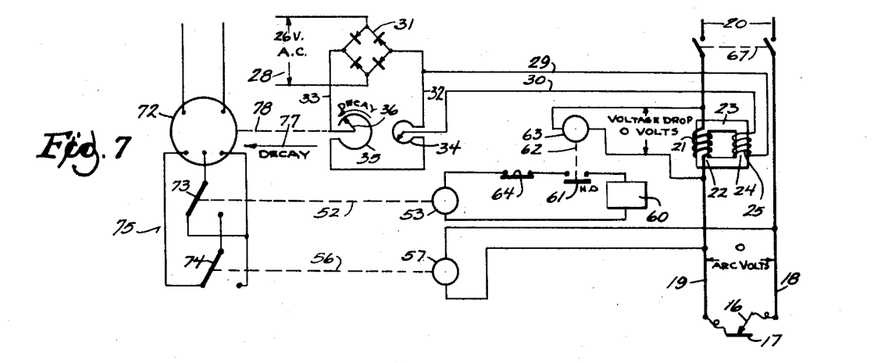
Figs. 7 through 12 are schematic circuit diagrams showing a circuit embodying the invention and in which an alternating current reversing motor is used for actuating the rheostat, each figure showing a different stage in the welding cycle.

*Figure 7*

Fig. 7 shows the status of the circuit comparable to that shown for the D.C. motor in Fig. 1. The switch 67 is open and the voltage across the welding leads and the current through the A.C. reactor coil 21 is zero, as is indicated in the legends. Accordingly, the switches 73, 74 are positioned as indicated and the arm 36 is in its extreme counterclockwise position shown in which maximum resistance is in the circuit to the D.C. excitation windings 25 of the saturable reactor so that the circuit is pre-conditioned for striking the arc with a minimum blasting effect.

Figure 8:
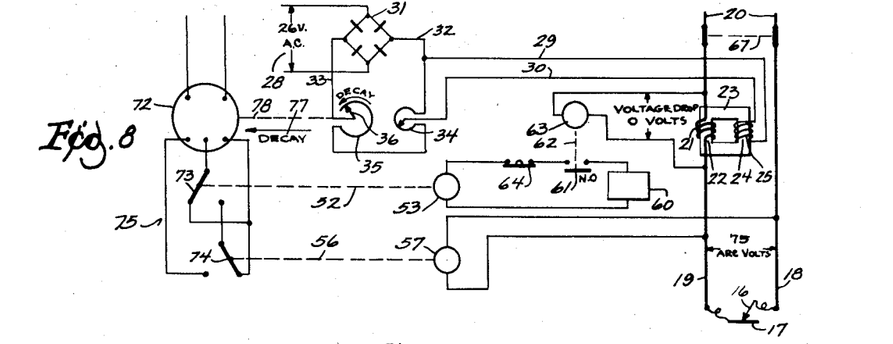

*Figure 8*

Fig. 8 illustrates the point in the welding cycle comparable to Fig. 2 in which the switch 67 has been closed, thus to impose open circuit voltage on the relay 57, although no current is being drawn through the welding lines 18, 19. Relay 57, accordingly will pick up to throw switch 74 to its position shown in Fig. 8. However no change in the direction in which the motor tends to rotate will result inasmuch as switch 73 remains in its original position.

Figure 9:
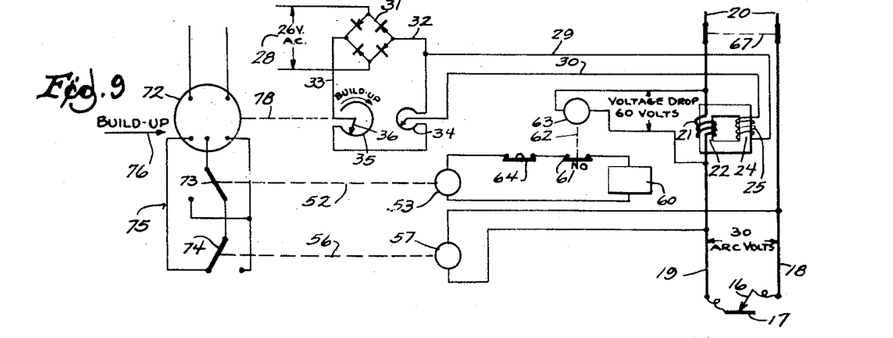

*Figure 9*

This figure shows the stage in the welding cycle which corresponds to that shown in Fig. 3. The arc has been struck at a point in which maximum impedance is offered to the flow of welding current, hence avoiding a blasting start. However, the voltage across the welding leads 18, 19 will drop to closed circuit value, for example 30 volts, as is indicated by the legend in Fig. 9, and the relay 57 will accordingly drop out to restore switch 74 to its position shown in Figs. 7 and 9. Relay 63 will also pick up, because of the heavy flow of current through the A.C. reactor coil 21, thus to close switch 61 and complete a circuit to the relay 53 which will pick up to throw switch 73 to a position which completes the illustrated circuit through the switching network 75. Current will now flow in the direction of arrow 76 and motor 72 drives the rheostat arm 36 in a clockwise direction, thus to tend to saturate the reactor and reduce the impedance of coil 21 and hence build up the current in the welding circuit. When the control arm 36 reaches its extreme clockwise position, the welding current will reach its maximum value as determined by the position of potentiometer 34 and the other constants of the circuit. Accordingly, Fig. 9 illustrates the position of the various switches, etc., when the operator is welding at full welding current.

Figure 10:
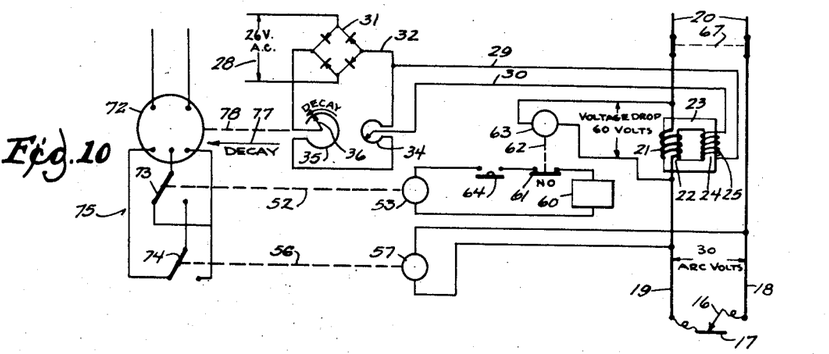

Figure 10

Fig. 10 illustrates the position of the various switches and relays at the stage in the welding cycle which corresponds to Fig. 4. The operator is approaching the end of the weld and has opened the decay switch 64, thus to drop out the relay 53, permitting switch 73 to be restored to its position also shown in Fig. 7. Accordingly, current will flow through the network 75 in the direction of arrow 77, thus to apply torque to motor 72 in a direction to rotate the arm 36 of the rheostat 35 in a counterclockwise direction and decay the welding current flowing through the lines 18, 19. As soon as the welding current drops below that necessary to maintain the arc, the arc will snuff out without forming a crater.

Figure 11:
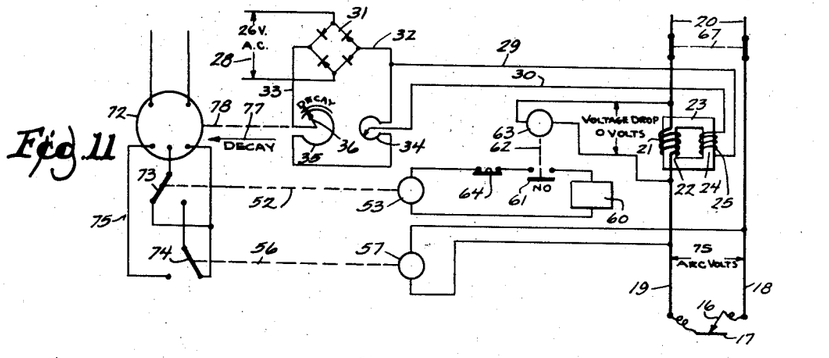

Figure 11

Fig. 11 illustrates the stage in the welding cycle comparable to that shown in Fig. 5. Instead of opening the decay switch 64, the operator has simply interrupted the arc by lifting the electrode. Relay 63 drops out because there is no longer any welding current flowing through the A.C. reactor coil 21. Accordingly, switch 61 opens to drop out the relay 53 and permit switch 73 to be restored to its position also shown in Fig. 7. At the same time relay 57 is subject to the full open circuit voltage of the welder and the relay picks up to shift switch 74 to its position also shown in Fig. 8. In this position of the switches, arm 36 of the rheostat will be driven to its decay position as the current in the network 75 will flow in the direction of arrow 77.

Figure 12:
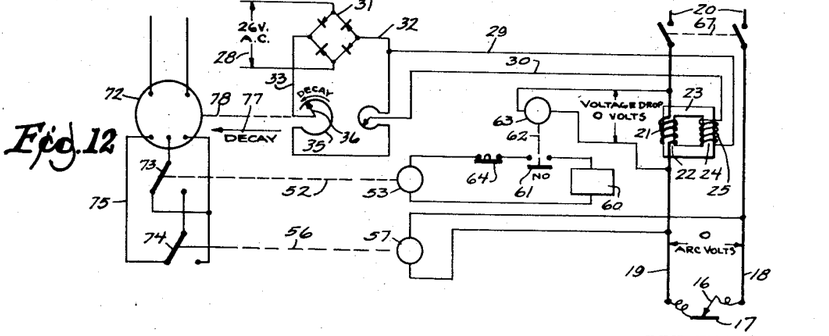

Figure 12

This figure illustrates the stage in the welding cycle comparable to that shown in Figure 6 and in which the operator neither opens decay switch 64 nor lifts the electrode from the work, but opens switch 67. Both relays 63 and 57 will now drop out, inasmuch as the arc voltage and arc current are both zero. This results in the opening of switch 61 to drop out the relay 53. Switches 73, 74 will assume their positions shown in this figure, thus resulting in a flow of current in network 75 in the direction of arrow 77. Accordingly, the contact arm 36 of the rheostat will rotate counterclockwise so as to precondition the device for a start on the next weld at the minimum welding current and thus avoid a blasting start.

In the embodiments of the invention chosen for exemplification, the respective motors drive rheostats having continuous resistance elements. Accordingly, the buildup and decay curves for welding current will have slopes determined by the rheostat characteristics. This, of course, is subject to such alterations as will best suit the welding cycle desired. The rheostat 35 and arm 36 could be replaced by a tap switch with adjustable resistors between the taps. This would permit a corresponding change in the shape of the buildup and decay curve, depending upon the positioning of the taps and the resistance therebetween. Moreover, the rheostarts 69, 70, 71, could also be replaced by tap switches and adjustable resistances between taps or any equivalent structure.

For automated installations, decay switch 64 can be replaced by a limit switch in the path of movement of the electrode holder for automatic actuation thereof.

For simplification in illustration switch 67 is shown in the load line to the welding electrodes. In actual practice it would ordinarily be in the primary lines to the welding machine,

I claim:
1. In an electric arc welder having welding electrodes, a line to said electrodes and controllable means for varying the current supplied through said line to said electrodes, the improvement for automatically controlling the buildup and decay of welding current across the arc and comprising control means subject to the voltage across said line and current in said line for actuating said controllable means in response to line voltage and line current conditions characteristic of stages in the welding cycle.

2. The device of claim 1 in which said control means comprises means for automatically decaying welding current whenever the arc is broken.

3. The device of claim 1 in which said control means comprises means for automatically decaying welding current prior to the striking of the arc so that the arc will be srtuck without blasting.

4. The device of claim 1 in which said control means comprises means for automatically decaying welding current prior to the striking of the arc so that the arc will be struck without blasting, and means for automatically building up welding current after the arc has been struck until it reaches a full welding current value.

5. The device of claim 1 in which said control means comprises means whereby the operator can manually decay welding current prior to interruption of the welding cycle to avoid forming a crater at the end of the weld.

6. The device of claim 1 in which said controllable means comprises a saturable reactor frame, said line having an A.C. winding on said frame, a control winding on said frame, a source of current for said control winding and rheostat means between said source and said control winding, said control means comprising a motor for said rheostat and welder line voltage and current responsive means for reversing the direction in which said motor drives said rheostat means.

7. The device of claim 6 in further combination with means for interrupting drive from the motor to the rheostat means after the motor has turned the rheostat means to a preselected position.

8. The device of claim 6 in which said motor has a source of power and motor speed control means between said source and said motor to control the rate of buildup and decay of current in the welding line.

9. The device of claim 6 in which said motor has a source of power and separate motor speed control means between said source and said motor to independently control respectively the rate of buildup and the rate of decay of current in the welding line.

10. An electric arc welder comprising arc welding electrodes, a welding line to said electrodes and a source of electric power therefor, a saturable reactor frame, said line having an A.C. winding about said frame, a saturation winding about said frame and controllable means for selectively energizing said saturation winding to vary the saturation of the frame and hence control the current supplied by said line to the welding electrodes, rheostat means for controlling the magnitude of the current flowing in said saturation winding, an electric motor coupled to said rheostat means, a switching network in the motor circuit including switches for changing the direction in which said motor drives said rheostat means and control means responsive to the voltage and current in said line for automatically actuating said switches in response to line voltage and line current conditions characteristic of stages in the welding cycle and to automatically build up and decay welding current in accordance therewith.

11. The device of claim 10 in which said control means comprises a relay responsive to the voltage across said line, a switch in said network connected to said relay, said relay being set to throw the switch in one direction when the line voltage exceeds a preselected value and to throw the switch in the opposite direction when the line voltage falls below a preselected value.

12. The device of claim 10 in which said control means comprises a relay responsive to current flowing through said line, a switch in said network connected to said relay, said relay being set to throw the switch in one direction when the line current exceeds a preselected value and to throw the switch in its opposite direction when the line current falls below a preselected value.

13. In an electric arc welder having welding electrodes and a line to said electrodes, the combination of controllable means for varying the current supplied through said line to said electrodes and including main rheostat means, a motor and means coupling the motor to the main rheostat means and means for reversing the direction in which the motor drives the main rheostat means, and means for independently and selectively controlling the speed of the motor in both said directions and comprising separate rheostat means, one for controlling motor speed in the direction in which it drives the main rheostat means to build up the welding current in said line and another for controlling motor speed in the direction in which it drives the main rheostat means to decay the welding current in said line.

14. In an electric arc welder having welding electrodes and a line to said electrodes, the combination of controllable means for varying the current supplied through said line to said electrodes and including a rheostat, a motor and means coupling the motor to the rheostat, and switching means for reversing the direction in which the motor drives the rheostat including limit switches for interrupting drive from the motor to the rheostat after the motor has turned the rheostat to a predetermined position in either direction of rotation.

15. The device of claim 14 in which said limit switches are actuated by cams turnable with the rheostat, said cams being adjustable to change in point of time their coaction with the switches.

References Cited in the file of this patent
UNITED STATES PATENTS 2,642,515    Bagg ________________ June 16, 1953

Notice of Adverse Decision in Interference

In Interference No. 93,048 involving Patent No. 2,951,972, J. W. Pomazal, CONTROL MECHANISM FOR AN ELECTRIC ARC WELDER, final judgment adverse to the patentee was rendered Jan. 6, 1965, as to claim 14.
[*Official Gazette February 23, 1965.*]